3,014,884
FRICTION ELEMENTS FOR BRAKES, CLUTCHES AND SIMILAR MECHANISMS AND METHODS OF MAKING SAME
Horace Arthur Bray, Coventry, England, assignor to Dunlop Rubber Company Limited, London, England, a British company
No Drawing. Filed Nov. 5, 1957, Ser. No. 694,493
18 Claims. (Cl. 260—38)

This invention relates to friction element for brakes, clutches and similar mechanisms and to a method of manufacturing such element.

Friction elements for brakes and similar mechanisms are normally made either from solid metals such as cast iron or from organically bonded materials, e.g. asbestos bonded with thermosetting resins, or from inorganic materials such as refractory oxides or ceramics held in a matrix of metal.

Very heavy duty brakes, such as aircraft brakes, for which the friction materials comprising refractory oxides or ceramics were largely developed, require a very rapid dissipation of heat. The refractory oxides and ceramic materials, however, are good thermal insulators so that even when bonded with a metal matrix the friction materials cannot quickly dissipate the heat generated on braking, with the result that the surface temperature at the friction interface remains very much higher than the mass of the material immediately behind it. Further, the materials so far used generally tend to cause the brake to fade with successive brake application, especially when the friction producing material is a hard abrasive or refractory oxide. This tendency to fade may not be so marked with certain calcined aluminium silicate products such as mullite, but mullite has the disadvantage, when used as a brake friction material, that its friction increases as the rubbing speed of the brake decreases towards zero speed, and this may set up vibration and shudder in the brake.

The object of the present invention is to provide friction elements for brakes and similar mechanisms which do not suffer from these disadvantages.

According to the present invention friction elements for brakes and the like comprise a substantially water- and heat-resistant metal phosphide contained in a suitable matrix.

The phosphides which may be used are preferably of the metals cobalt, copper, iron, manganese, molybdenum, nickel, titanium and tungsten, all of which are substantially water-resistant and have a high melting point. Of these metal phosphides copper, iron and nickel are most readily available, e.g. a cheap source of iron phosphide is ferro-phosphorus, which is a by-product in the manufacture of phosphorus.

The matrix may be inorganic and consist of or contain a preponderance of copper, or it may consist wholly or partly of iron, nickel, cobalt, brass or bronze. Alternatively it may comprise a suitable inorganic non-metallic substance. The matrix is not confined to inorganic materials and it may comprise an organic thermosetting resinous material such as phenol-formaldehyde resin or melamine-formaldehyde resin or a mixture of these.

The friction materials may also comprise certain fillers, and also wear-modifying agents and lubricants, such as molybdenum disulphide and graphite.

Friction elements in accordance with the invention having a metal matrix, and being particularly suitable for aircraft disc brakes will now be described. The composition generally falls within the following limits:

| | Percent by weight |
|---|---|
| Matrix | 30–99 |
| Metal phosphide | 1–70 |

The matrix is normally copper, or copper plus up to 40% tin and/or zinc, but it is possible to replace all or part of the copper with iron, brass, bronze, cobalt or nickel, whilst the following may be added to impart other desirable properties, graphite 1–25%, silica 1–20%, lead 1–20%, molybenum disulphide 1–20%, manganese 1–40%.

The metal phosphide acts as the prime friction-producing ingredient and the metal acts as the binder and imparts strength to the whole composition. The iron when present acts as a secondary friction producer, also as a wear modifier, and helps to impart strength to the composition. Manganese acts as a friction modifier. Silica acts as a friction modifier and wear reducer. Lead, molybdenum-disulphide and graphite act as lubricants and also as wear modifiers.

Although heat- and water-resistant metal phosphides generally may be used only iron phosphide, copper phosphide and nickel phosphide are readily obtainable and of these iron phosphide is the cheapest and most easily produced. While the pure form of iron phosphide may be produced by combining the correct proportions of the elements, a commercial form of iron phosphide is readily available, known as ferro-phosphorus. This is produced as a by-product in the production of elemental phosphorus from phosphorus-containing minerals. The mineral is normally calcined to drive off the phosphorus and some phosphorus remains behind and combines with the iron present to form iron phosphide. The major constituent of the ferro-phosphorus is di-iron phosphide—$Fe_2P$, with some mono-iron phosphide—$FeP$, and some tri-iron phosphide. Impurities are also present in the ferro-phosphorus and an X-ray diffraction analysis has revealed no free phosphorus, alumina ($Al_2O_3$), or mullite ($3Al_2O_3 2SiO_2$), but some traces of quartz and complicated slags of the Gehlenite ($2CaO, Al_2O_3, SiO_2$), Akermanite ($2CaO, MgO, SiO_2$, and pseudo-Wollastonite ($CaO, SiO_2$) type were found. These impurities do not affect the efficacy of ferro-phosphorus and friction materials made from both pure iron phosphide and ferro-phosphorus gave identical results when used in a brake mechanism.

Friction elements according to the present invention and having a metal matrix normally fall within the following compositional limits, all percentages being by weight:

| 1 | Percent |
|---|---|
| Copper | 10–90 |
| Tin | 1–40 |
| Iron phosphide or ferro-phosphorus | 1–70 |

| 2 | Percent |
|---|---|
| Copper | 10–90 |
| Tin | 1–40 |
| Iron | 1–20 |
| Ferro-phosphorus | 1–70 |

| 3 | Percent |
|---|---|
| Copper | 10–90 |
| Graphite | 1–25 |
| Ferro-phosphorus | 5–70 |

| 4 | Percent |
|---|---|
| Copper | 30–90 |
| Copper phosphide | 10–70 |

| 5 | Percent |
|---|---|
| Copper | 10–90 |
| Tin | 1–40 |
| Copper phosphide | 1–70 |

| 6 | Percent |
|---|---|
| Copper | 30–90 |
| Nickel phosphide | 10–70 |

| 7 | Percent |
|---|---|
| Copper | 10–90 |
| Tin | 1–40 |
| Nickel phosphide | 1–70 |

| 8 | Percent |
|---|---|
| Copper | 10–90 |
| Tin | 1–40 |
| Graphite | 1–25 |
| Ferro-phosphorus | 1–70 |

| 9 | Percent |
|---|---|
| Copper | 10–90 |
| Tin | 1–40 |
| Graphite | 1–25 |
| Ferro-phosphorus | 1–70 |
| Lead | 1–20 |

| 10 | Percent |
|---|---|
| Copper | 10–90 |
| Tin | 1–40 |
| Iron | 1–40 |
| Ferro-phosphorus | 1–70 |
| Graphite | 1–25 |

| 11 | Percent |
|---|---|
| Copper | 10–90 |
| Zinc | 1–40 |
| Graphite | 1–25 |
| Ferro-phosphorus | 1–70 |

| 12 | Percent |
|---|---|
| Iron | 30–90 |
| Iron phosphide | 10–70 |

| 13 | Percent |
|---|---|
| Copper | 10–90 |
| Zinc | 1–40 |
| Iron phosphide | 1–70 |

In formulating friction materials from any of the foregoing general compositions, the actual ratio of ingredients is chosen to impart specific properties to the materials. Increasing the amount of the phosphide, whilst decreasing the wear rate at first, finally increases it and at the same time gives a composition with reduced green strength. The coefficient of friction generally increases as the phosphide content increases. The metal phosphide, whilst forming the principal friction producer, can also be used as a relatively inexpensive filler in those cases where a low wear rate is required. When used in this way the metal phosphide imparts to the material a higher thermal conductivity than would be obtained with those fillers normally used, such as barytes, china clay etc., while maintaining a stable coefficient of friction.

Friction materials according to the above formulations are made by mixing the finely divided components in the correct proportions, placing the mixture in a mould and pressing at a pressure in excess of 3 tons/sq. in. The preferred pressure is between 5 and 50 tons/sq. in. After pressing, the "green" composition is then heated in a suitable atmosphere to sinter the metal particles, at a temperature sufficiently high to give good sintering. After sintering, the composition is placed in a suitable container such as a cold rolled steel cup and if necessary coined to size. It has been found possible to place a suitable container into the mould, add the powder and press the whole at above 3 tons sq. in. The pressed composition in its container is then heated at a suitable temperature in a suitable atmosphere in order to sinter the binder. Suitable atmospheres have been found to be $CO_2$, $H_2$, cracked ammonia or cracked coal gas, although most reducing or non-oxidising atmospheres have been found to be satisfactory.

Another method of manufacturing these materials comprises the steps of mixing predetermined quantities of the powdered or comminuted constituents and pressing in a suitable mould, followed by sintering. The composition may then be attached by any normal means such as riveting to a suitable backing plate. Yet another method consists of moulding the powdered or comminuted materials in a mould, placing the green biscuit so formed in contact with a suitable backing plate, applying a low pressure and sintering the composition in a suitable atmosphere.

Although the use of a cup to contain friction elements of this type has been proposed, it is intended that they should be used in any way in which conventional friction elements are used and may be affixed to any backing or holding plate in any conventional manner, such as riveting, brazing etc.

The size of the metal phosphide particles should be finer than about 20 mesh and about 100 mesh is preferred. Some difficulty may be experienced in mixing if larger particles are present because of the high density of the material and its consequent greater mass.

It is generally accepted that fade during braking and with successive braking stops is due to the formation at the braking surface of a high melting point glaze and that the preventing of the formation of this glaze is a prerequisite of good brake lining formulation. This glaze is generally caused by the chemical reactions at the elevated temperatures generated during braking between the components of the friction lining and the metal of the friction mating surface. Since the metal phosphides are semi-metallic in composition and, as stated, possess a relatively high thermal conductivity, then the temperature at the friction interface is kept to a minimum and the chemical reactions between the friction material and the mating surface do not produce a glaze of the type which exerts a deleterious effect on the friction coefficient.

Further, some of the metal phosphides are composed of brittle angular particles which break very readily when frictional forces are applied to them. This effectively maintains a relatively fresh friction surface in contact with the mating member. The presence of phosphates in the surface of a friction pad after use suggests that oxidation occurs preferentially at the pad surface, leaving the mating surfaces free of the higher oxides of iron which are thought by some workers in this field to exert a deleterious effect on the friction surface.

Friction materials have been manufactured as follows. The powdered constituents were weighed in the proportions shown in the various examples in Table I:

*Table I*

|  | I | II | III | IV | V | VI | VII | VIII |
|---|---|---|---|---|---|---|---|---|
| Copper | 40 | 40 | 40 | 26 | 40 |  | 65 |  |
| Tin | 5 | 5 | 5 |  | 5 |  |  |  |
| Iron | 20 | 20 | 20 |  | 25 | 85 |  | Material not containing metal phosphides. |
| Graphite | 10 | 10 | 10 |  | 10 |  |  |  |
| Copper phosphide. | 20 |  |  |  |  |  |  |  |
| Nickel Phosphide. |  | 20 |  |  |  |  |  |  |
| Iron Phosphide. |  |  | 20 | 65 | 25 | 15 | 35 |  |
| Zinc |  |  |  | 9 |  |  |  |  |

The powdered constituents were then mixed in a horizontal U trough powder blender and the requisite amount by weight placed in a suitable container in a mould and subjected to a pressure of about 20 tons/sq. in., the pressed composition removed from the mould and sintered for about one hour in a non-oxidising atmosphere. The temperature at which the compositions are sintered varies with the binder and is usually accepted as being about 70% of its melting point. Examples I, II, III, IV, V and VII and VIII were sintered at about 780° C. and Example VI at 1000° C.

After sintering the pads were placed in a disc brake type mechanism and tested on an inertia wheel type dynamometer as follows. The flywheel was accelerated from rest to a speed of 1200 r.p.m., the motor disengaged, pressure applied to pistons on one side of the friction pads and the time taken for the flywheel to come to rest noted. This was repeated for a further 14 times with no intermediate cooling of the brake disc allowed. The thickness of the disc was chosen to give a soak temperature of about 350° C. at the end of the first stop and a soak temperature of about 800° C. at the end of the fifteenth stop. Each succeeding stop is thus carried out at a higher temperature than that immediately preceding it. It has been found that this test successfully differentiates between materials that can usefully be employed on heavy duty applications and those which cannot.

*Table II*

| Stop No. | I | II | III | IV | V | VI | VII | VIII |
|---|---|---|---|---|---|---|---|---|
| 1 | 13.4 | 13.7 | 21.8 | 25.5 | 18.8 | 18.1 | 25.9 | 17.8 |
| 2 | 13.0 | 12.5 | 18.8 | 13.6 | 17.5 | 16.0 | 14.5 | 18.1 |
| 3 | 13.0 | 13.0 | 16.2 | 13.0 | 17.2 | 15.5 | 14.0 | 19.4 |
| 4 | 13.0 | 13.9 | 15.8 | 12.6 | 16.5 | 16.0 | 16.5 | 19.8 |
| 5 | 13.0 | 13.0 | 15.9 | 12.3 | 16.9 | 16.3 | 17.1 | 19.9 |
| 6 | 14.6 | 14.5 | 16.5 | 12.3 | 16.2 | 16.2 | 17.7 | 21.3 |
| 7 | 14.6 | 16.2 | 16.3 | 12.2 | 15.9 | 16.1 | 17.8 | 23.4 |
| 8 | 14.8 | 17.0 | 17.2 | 12.3 | 16.2 | 16.4 | 17.8 | 25.5 |
| 9 | 15.6 | 18.0 | 17.5 | 12.4 | 16.4 | 17.0 | 17.8 | 26.5 |
| 10 | 15.0 | 18.5 | 16.8 | 12.3 | 16.2 | 16.3 | 17.8 | 28.0 |
| 11 | 15.0 | 17.5 | 17.0 | 12.3 | 16.5 | 17.0 | 17.6 | 28.9 |
| 12 | 14.9 | 18.5 | 17.1 | 12.3 | 16.4 | 17.2 | 17.1 | 29.4 |
| 13 | 16.1 | 18.5 | 16.8 | 12.5 | 17.0 | 17.0 | 16.6 | 30.1 |
| 14 | 17.0 | 17.5 | 16.3 | 12.3 | 16.9 | 17.2 | 16.3 | 30.1 |
| 15 | 16.5 | 18.5 | 16.4 | 12.6 | 17.1 | 17.6 | 15.0 | 31.2 |

Table II gives results obtained on friction materials I—VII from Table I and material No. VIII made in the same way, but not containing a metal phosphide as the prime friction producer. The prime friction producer in Example VIII was an alumina-silica product. The figures given relate to the stopping times in seconds of the flywheel when the elements were tested as above. For a given system, since the stopping time is inversely proportional to the torque produced, a comparison of stopping times is a direct measure of the efficacy of the braking media.

It will be seen from these results that, although a wide range of compositions within the limits of the invention were tested, all of the variants I–VII show stable friction properties over a very wide temperature range, whilst the friction material not containing a metal phosphide exhibits a steady deterioration in friction characteristics. Subsequent tests on larger brake mechanisms and on actual aircraft have confirmed the results obtained on the small test unit. On one aircraft disc brake designed to absorb $6.31 \times 10^6$ ft. lbs. energy, fifty full kinetic energy stops were carried out followed by one high energy stop absorbing $11.62 \times 10^6$ ft. lbs. Using metal ceramic friction elements the coefficient of friction started at .295 and had dropped to .225 on the fiftieth stop. On the 51st (high energy) stop the coefficient of friction was down to .150. The wear rate on this type of lining on this test was .00108″ per stop. Using friction elements of the conventional organically bonded asbestos type, the coefficient of friction started at .230 and dropped to .200 on the fiftieth stop. The 51st (high energy) stop gave a coefficient of friction of .145. These elements gave a wear rate of .0080″ per stop. Friction elements made according to this invention gave an initial coefficient of friction of .275 and dropped to .255. On the fifty-first stop (high energy) the coefficient of friction was .162 and its wear rate was only .0004″ per stop. In the case of both the organic elements and the metal ceramic elements the brake mechanism was not capable of further work, owing to the effect of the high temperature on the rotor discs. In the case of the elements containing the metal phosphide a further 27 full kinetic energy stops were carried out after the fifty-first (high energy) stop was completed.

The high density of the metal phosphide, compared with, say, ceramics means that for a given weight percentage of a metal phosphide, the volume percentage will be relatively low. Thus a friction element having 20% by weight of metal phosphide and 80% by weight of metal binder will have a greater volume percentage of metal than a metal ceramic element containing 80% by weight of metal and 20% by weight of ceramic. This helps towards the very much improved "green" strength which metal phosphide friction elements possess over conventional metal ceramic types.

Suitable metal phosphides may alternatively be incorporated in an organic matrix comprising a thermo-setting resinous material such a phenol-formaldehyde resin or melamine-formaldehyde resin or a mixture of these. A filler, such as asbestos, and the usual wear-modifying and lubricating agents may also be incorporated.

The metal phosphides, being semi-metallic, are relatively good heat conductors compared with materials usually incorporated in resin bonded friction elements and when present help to conduct heat away from the friction mating surfaces. This, in turn, dissipates the heat produced during braking more evenly through the whole braking mechanism, thus allowing the friction materials to become part of the heat sink. Increase in thermal conductivity in organic materials has previously been achieved by the addition of metal powders or chippings, but when friction materials made in this way are subjected to such conditions as to give very high brake plate or drum temperatures (500–1,000° C.) it has been found that the organic bonding agent breaks down and causes rapid deterioration of the material with subsequent loss in friction and high wear. The use of metal phosphides in friction materials subjected to high temperatures does not give such deterioration in either wear or friction.

Typical compositions, which have given good results, are as follows:

1.

|   | Parts by weight |
|---|---|
| Binder | 25 |
| Iron phosphide | 200 |
| Asbestos fibre | 50 |

The asbestos fibre may be pre-impregnated with resin.

2.

|   | Parts by weight |
|---|---|
| Resin-impregnated asbestos | 100 |
| Iron phosphide | 100 |

3.

|   | Parts by weight |
|---|---|
| Resin-impregnated asbestos | 100 |
| Iron phosphide | 100 |
| Graphite | 25 |

The binder consists of a phenol-formaldehyde resin, incorporating the necessary hardening agent.

One method of making an organically-bonded friction element in accordance with the present invention comprises the steps of mixing the ingredients dry and pressing the mix in a suitable mould at pressures from about 1 ton to about 7 tons per square inch whilst heating the mould to a temperature sufficiently high to cure the binder. Wet mixing in the presence of a suitable organic solvent, evaporation of the excess solvent, followed by extrusion and subsequent heat treatment, may also be used. A second heat treatment may improve the quality of the material.

Advantages obtained by the use of a metal phosphide in a friction material, with either an organic or an inorganic matrix, are as follows:

(1) Its relatively high thermal conductivity allows its use as part of the heat sink of a brake or clutch mechanism, thus reducing the total weight of the brake, and also the total volume of the mechanism.

(2) Its rate of wear is lower than that of other friction materials giving comparable friction when used under very high temperature conditions.

(3) Its coefficient of friction is higher at high temperature than that of conventional organic-bonded friction materials.

(4) The coefficient of friction does not rise appreciably as the static condition is approached from dynamic, thus reducing the possibility of chatter and allowing of less highly stressed members.

(5) Even without other lubricants, metal phosphides give smooth engagement characteristics and consequently preserve the friction mating surface in good condition.

(6) Chemical reactions at the friction interface in the presence of the metal phosphide minimises the formation of undesirable oxides which have a deleterious affect on the frictional characteristics.

Whilst friction materials in accordance with the present invention will find their greatest use in brakes, particularly in disc brakes for aircraft and certain types of vehicle and industrial applications, they can also be used in drum brakes and clutches.

Having now described my invention, what I claim is:

1. A friction element for brakes, clutches and similar mechanisms consisting essentially of a compact matrix of material selected from the group consisting of the metals: copper, iron, nickel, cobalt, brass, bronze; mixtures thereof with tin and mixtures thereof with zinc: and organic thermosetting resinous material, wherein is dispersed angular particles of a water and heat resistant phosphide of a metal selected from the group consisting of copper, tin, zinc, iron, brass, bronze, cobalt and nickel, said particles constituting from 1 percent to 70 percent of the weight of said material and particles.

2. A friction element according to claim 1 wherein the angular particles are of iron phosphide and constitute from 15 percent to 65 percent of the weight of said material and particles.

3. A friction element according to claim 1 wherein the phosphide is iron phosphide forming a major constituent of ferro-phosphorus.

4. A friction element according to claim 1 wherein the matrix material is a phenol-formaldehyde resin.

5. A friction element according claim 1 comprising an inorganic fibrous material.

6. A friction element according to claim 1 comprising between about 20% and about 80% by weight of asbestos.

7. A friction element according to claim 1 comprising between about 1% and about 25% by weight of graphite.

8. A friction element according to claim 1 comprising between about 1% and about 20% by weight of silica.

9. A friction element according to claim 1 comprising between about 1% and about 20% by weight of lead.

10. A friction element according to claim 1 comprising between about 1% and about 20% by weight of molybdenum disulphide.

11. A friction material according to claim 1 comprising between about 1% and about 40% by weight of manganese.

12. The friction elements of claim 1 in which said particles are of the fineness of from 20 to 100 mesh.

13. A method of making a friction element comprising mixing finely divided matrix material selected from the group consisting of the metals: copper, iron, nickel, cobalt, brass, bronze: mixtures thereof with tin and mixtures thereof with zinc: and organic thermosetting resinous material, with angular particles of a water and heat resistant phosphide of a metal selected from the group consisting of copper, tin, zinc, iron, brass, bronze, cobalt and nickel, said particles constituting from 1 percent to 70 percent of the weight of said material and particles, compacting the mixture at a pressure of between 1 to 50 tons per square inch and sintering the compact thus formed at a temperature not exceeding 1000° C. in a non-oxidizing atmosphere.

14. A method according to claim 13 wherein the materials are compacted and sintered in a container forming part of the friction element.

15. A method according to claim 13 wherein the matrix material is a phenol-formaldehyde resin, the mixture is compacted at a pressure of between 1 and 7 tons per square inch and the compact thus formed is heated to cure the phenol-formaldehyde resin.

16. A method according to claim 15 wherein the angular particles are of iron phosphide.

17. A method according to claim 13 wherein the angular particles are of iron phosphide and are incorporated in the element by the addition of ferro phosphorus.

18. A method according to claim 13 wherein the angular particles are of iron phosphide and constitute from 15 percent to 65 percent of the weight of said materials and particles.

References Cited in the file of this patent

UNITED STATES PATENTS

| | | |
|---|---|---|
| 1,899,239 | De Lukacsevics | Feb. 28, 1933 |
| 2,291,734 | Lenel | Aug. 4, 1942 |
| 2,357,409 | Kuzmick | Sept. 5, 1944 |
| 2,369,502 | Walker | Feb. 13, 1945 |
| 2,379,166 | Lucid | June 26, 1945 |
| 2,488,332 | Roush | Nov. 15, 1949 |
| 2,784,105 | Stedman et al. | Nov. 5, 1957 |

FOREIGN PATENTS

| | | |
|---|---|---|
| 456,948 | Canada | May 24, 1949 |

UNITED STATES PATENT OFFICE
CERTIFICATION OF CORRECTION

Patent No. 3,014,884                         December 26, 1961

James D. Shimmin et al.

It is hereby certified that error appears in the above numbered patent requiring correction and that the said Letters Patent should read as corrected below.

Column 2, line 67, for "in", first occurrence, read -- is --; column 3, line 1, for "hydrogenations" read -- hydrogen atoms --; column 4, Table I, column 10, line 2, of the table, for "18.4" read -- 1.84 --; column 5, line 7, for "phenolthiazine" read -- phenothiazine --; column 5, lines 18 to 24, the formula should appear as shown below instead of as in the patent

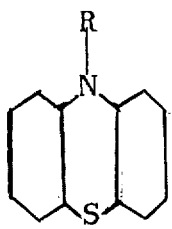

Signed and sealed this 8th day of May 1962.

(SEAL)
Attest:

ERNEST W. SWIDER
Attesting Officer

DAVID L. LADD
Commissioner of Patents

UNITED STATES PATENT OFFICE
CERTIFICATE OF CORRECTION

Patent No. 3,014,884  
December 26, 1961

Horace Arthur Bray

It is hereby certified that error appears in the above numbered patent requiring correction and that the said Letters Patent should read as corrected below.

Column 7, line 28, and column 8, line 13, strike out "tin, zinc, brass, bronze,", each occurrence.

Signed and sealed this 10th day of July 1962.

(SEAL)  
Attest:

ERNEST W. SWIDER  
Attesting Officer

DAVID L. LADD  
Commissioner of Patents